US00RE48760E

(19) United States
(12) Reissued Patent
Holder

(10) Patent Number: US RE48,760 E
(45) Date of Reissued Patent: Sep. 28, 2021

(54) METHOD AND APPARATUS FOR PLACING A LONG DISTANCE CALL BASED ON A VIRTUAL PHONE NUMBER

(71) Applicant: VONAGE AMERICA INC., Holmdel, NJ (US)

(72) Inventor: Louis Holder, Princeton Jct, NJ (US)

(73) Assignee: Vonage Business Inc., Holmdel, NJ (US)

(21) Appl. No.: 14/322,229

(22) Filed: Jul. 2, 2014

Related U.S. Patent Documents

Reissue of:
(64) Patent No.: 8,213,594
Issued: Jul. 3, 2012
Appl. No.: 13/157,504
Filed: Jun. 10, 2011

U.S. Applications:
(60) Continuation of application No. 12/692,808, filed on Jan. 25, 2010, now abandoned, which is a
(Continued)

(51) Int. Cl.
*H04M 7/00* (2006.01)
*H04L 12/66* (2006.01)
(Continued)

(52) U.S. Cl.
CPC ..... *H04M 7/122* (2013.01); *H04M 15/00* (2013.01); *H04M 15/56* (2013.01);
(Continued)

(58) Field of Classification Search
CPC ..... H04Q 3/66; H04Q 3/0016
(Continued)

(56) References Cited

U.S. PATENT DOCUMENTS 4,100,377 A 7/1978 Flanagan
4,748,620 A 5/1988 Adelmann et al.
(Continued)

FOREIGN PATENT DOCUMENTS

EP 1526697 7/2005
KR WO 02082792 A1 * 10/2002 ..... H04M 3/42008
(Continued)

OTHER PUBLICATIONS

Johnston, A., et al. "SIP Call Flow Examples" IETF Standard-Working-Draft, Internet Engineering Task Force (IETF), CH, vol. sip, No. 4 Apr. 2001, pp. 1-72, XP0 150277 1 1, ISSN:000-0004.
(Continued)

*Primary Examiner* — Stephen J. Ralis
(74) *Attorney, Agent, or Firm* — FisherBroyles, LLP

(57) ABSTRACT

A method and apparatus for reducing the cost of long distance phone calls is disclosed. Accordingly, an originating phone network is operatively connected to a first intermediate point, and a receiving phone network is operatively connected to a second intermediate point. Each intermediate point is operatively connected to communicate via a data network. Users on the originating and destination phone networks may communicate based on virtual numbers. The virtual number is preferably within the local calling area of the originating phone network. The first and second intermediate points route calls to any geographic location, regardless of distance, over the data network based on the virtual number. This provides the advantage of allowing a user on the originating phone network to access a user at a distant location for a price that is substantially similar to the price of a local call.

24 Claims, 3 Drawing Sheets

Related U.S. Application Data continuation of application No. 12/153,504, filed on May 20, 2008, now Pat. No. 7,680,262, which is a division of application No. 10/774,689, filed on Feb. 10, 2004, now Pat. No. 7,386,111.

(51) Int. Cl.
*H04M 7/12* (2006.01)
*H04M 15/00* (2006.01)
*H04M 3/523* (2006.01)

(52) U.S. Cl.
CPC ... *H04M 15/8044* (2013.01); *H04M 15/8055* (2013.01); *H04M 3/523* (2013.01); *H04M 2215/202* (2013.01); *H04M 2215/42* (2013.01); *H04M 2215/745* (2013.01); *H04M 2215/7464* (2013.01); *Y10S 379/901* (2013.01)

(58) Field of Classification Search
USPC ..... 379/221.01
See application file for complete search history.

(56) References Cited

U.S. PATENT DOCUMENTS 4,757,267 A 7/1988 Riskin
4,782,485 A 11/1988 Gollub
5,018,136 A 5/1991 Gollub
5,333,185 A 7/1994 Burke et al.
5,339,356 A 8/1994 Ishii
5,444,707 A 8/1995 Cerna et al.
5,452,289 A 9/1995 Sharma et al.
5,526,353 A 6/1996 Henley et al.
5,623,490 A 4/1997 Richter et al.
5,726,984 A * 3/1998 Kubler ..... B60R 16/0231 370/349
5,896,441 A * 4/1999 Akazawa ..... H04L 12/24 379/134
5,915,008 A * 6/1999 Dulman ..... H04L 63/0281 370/352
5,966,427 A 10/1999 Shaffer et al.
5,995,491 A 11/1999 Richter et al.
6,014,437 A 1/2000 Acker et al.
6,067,516 A 5/2000 Levay et al.
6,084,956 A 7/2000 Turner et al.
6,097,804 A 8/2000 Gilbert et al.
6,104,706 A 8/2000 Richter et al.
6,115,460 A 9/2000 Crowe et al.
6,115,468 A 9/2000 De Nicolo
6,118,860 A 9/2000 Hillson et al.
6,122,364 A 9/2000 Petrunka et al.
6,128,379 A 10/2000 Smyk
6,137,869 A 10/2000 Voit et al.
6,138,072 A 10/2000 Nagai
6,167,042 A 12/2000 Garland et al.
6,169,741 B1 1/2001 LeMaire et al.
6,175,565 B1 1/2001 McKinnon et al.
6,178,239 B1 1/2001 Kishinsky et al.
6,185,285 B1 2/2001 Relyea et al.
6,188,762 B1 2/2001 Shooster
6,195,425 B1 2/2001 Farris
6,226,286 B1 5/2001 Danne et al.
6,226,361 B1 5/2001 Koyama
6,243,443 B1 6/2001 Low et al.
6,249,576 B1 6/2001 Sassin et al.
6,266,405 B1 7/2001 Madour et al.
6,272,126 B1 8/2001 Strauss et al.
6,282,281 B1 8/2001 Low
6,282,284 B1 8/2001 Dezonno et al.
6,298,064 B1 10/2001 Christie
6,304,572 B1 10/2001 Christie
6,304,637 B1 10/2001 Mirashrafi et al.
6,304,653 B1 10/2001 O'Neil et al.
6,310,941 B1 10/2001 Crutcher et al.
6,311,182 B1 10/2001 Colbath et al.
6,320,951 B1 11/2001 Shtivelman et al.
6,327,572 B1 12/2001 Morton et al.
6,330,317 B1 12/2001 Garfinkel
6,337,889 B1 1/2002 Mita et al.
6,343,115 B1 1/2002 Foladare et al.
6,343,143 B1 1/2002 Guillemaud et al.
6,349,132 B1 2/2002 Wesemann et al.
6,351,256 B1 2/2002 Jones et al.
6,351,464 B1 2/2002 Galvin et al.
6,363,065 B1 * 3/2002 Thornton ..... H04L 12/14 370/352
6,366,577 B1 4/2002 Donovan
6,366,661 B1 4/2002 Devillier et al.
6,373,836 B1 4/2002 Deryugin et al.
6,373,936 B1 4/2002 Raniere et al.
6,373,938 B1 4/2002 Palacios et al.
6,385,209 B1 5/2002 Skirmont et al.
6,389,119 B1 5/2002 McBride
6,393,476 B1 5/2002 Barnhouse et al.
6,400,820 B1 6/2002 Edwards et al.
6,404,746 B1 6/2002 Cave et al.
6,404,882 B2 6/2002 Fellner et al.
6,404,884 B1 6/2002 Marwell et al.
6,408,062 B1 6/2002 Cave
6,408,065 B1 6/2002 O'Neil et al.
6,411,697 B1 6/2002 Creamer et al.
6,411,704 B1 6/2002 Pelletier et al.
6,415,269 B1 7/2002 Dinwoodie
6,421,437 B1 7/2002 Slutsman
6,422,242 B1 7/2002 Slautterback et al.
6,424,707 B1 7/2002 Chatterjee
6,430,175 B1 8/2002 Echols et al.
6,430,176 B1 8/2002 Christie, IV
6,430,289 B1 8/2002 Liffick
6,446,127 B1 9/2002 Schuster et al.
6,452,932 B1 9/2002 Christie
6,456,618 B2 9/2002 Kozdon et al.
6,463,052 B1 10/2002 Christie
6,466,570 B1 10/2002 Low et al.
6,470,010 B1 10/2002 Szviatovszki et al.
6,473,429 B1 10/2002 Christie
6,477,246 B1 * 11/2002 Dolan ..... H04M 3/4281 370/356
6,480,484 B2 11/2002 Morton
6,480,581 B1 11/2002 Wu et al.
6,487,200 B1 11/2002 Fraser
6,493,337 B1 12/2002 Stevenson, III
6,493,437 B1 12/2002 Olshansky
6,496,477 B1 12/2002 Perkins et al.
6,504,921 B2 1/2003 Kotik et al.
6,510,219 B1 1/2003 Wellard et al.
6,519,232 B1 2/2003 Becher
6,519,333 B1 2/2003 Malik
6,539,077 B1 3/2003 Ranalli et al.
6,542,589 B1 4/2003 Baskin
6,553,023 B1 4/2003 Yamamiya et al.
6,557,712 B2 5/2003 Gruber et al.
6,564,261 B1 5/2003 Gudjonsson et al.
6,567,398 B1 5/2003 Aravamudan et al.
6,567,419 B1 5/2003 Yarlagadda
6,571,212 B1 5/2003 Dent
6,574,216 B1 * 6/2003 Farris ..... H04L 41/5009 370/237
6,584,094 B2 6/2003 Maroulis et al.
6,584,098 B1 6/2003 Dutnall
6,584,186 B1 6/2003 Aravamudan et al.
6,584,510 B2 6/2003 Anttila
6,587,836 B1 7/2003 Ahlberg et al.
6,597,685 B2 7/2003 Miloslavsky et al.
6,614,786 B1 9/2003 Byers
6,614,899 B1 9/2003 Sollee et al.
6,621,899 B2 9/2003 Dezonno et al.
6,628,760 B2 9/2003 Mirashrafi et al.
6,633,561 B2 10/2003 Christie
6,647,112 B2 11/2003 Smith
6,650,890 B1 11/2003 Irlam et al.
6,665,294 B2 12/2003 Christie
6,665,389 B1 12/2003 Haste, III
6,665,392 B1 12/2003 Wellner et al.

(56) References Cited

U.S. PATENT DOCUMENTS

| | | | | |
|---|---|---|---|---|
| 6,668,055 | B2 | 12/2003 | Marwell et al. | |
| 6,678,357 | B2 | 1/2004 | Stumer et al. | |
| 6,681,252 | B1 | 1/2004 | Schuster et al. | |
| 6,690,780 | B2 | 2/2004 | Kotik et al. | |
| 6,694,007 | B2 | 2/2004 | Lang et al. | |
| 6,697,475 | B1 | 2/2004 | MeLampy et al. | |
| 6,707,811 | B2 | 3/2004 | Greenberg et al. | |
| 6,707,906 | B1 | 3/2004 | Ben-Chanoch | |
| 6,711,160 | B2 | 3/2004 | Chan et al. | |
| 6,714,988 | B2 | 3/2004 | Takemoto et al. | |
| 6,718,031 | B2 | 4/2004 | Fellner et al. | |
| 6,724,755 | B1 | 4/2004 | Kim | |
| 6,731,630 | B1 | 5/2004 | Schuster et al. | |
| 6,731,642 | B1 | 5/2004 | Borella et al. | |
| 6,731,741 | B1 | 5/2004 | Fourcand et al. | |
| 6,741,586 | B1 | 5/2004 | Schuster et al. | |
| 6,748,057 | B2 | 6/2004 | Ranalli et al. | |
| 6,760,429 | B1 | 7/2004 | Hung et al. | |
| 6,763,226 | B1 | 7/2004 | McZeal, Jr. | |
| 6,765,931 | B1 | 7/2004 | Rabenko et al. | |
| 6,769,020 | B2 | 7/2004 | Miyazaki et al. | |
| 6,771,637 | B1 | 8/2004 | Suzuki et al. | |
| 6,775,368 | B1 | 8/2004 | Lee et al. | |
| 6,778,661 | B1 | 8/2004 | Yumoto et al. | |
| 6,798,873 | B2 | 9/2004 | Vardi et al. | |
| 6,819,752 | B2 | 11/2004 | Raniere et al. | |
| 6,822,945 | B2 | 11/2004 | Petrovykh | |
| 6,839,359 | B2 | 1/2005 | Skirmont et al. | |
| 6,839,421 | B2 | 1/2005 | Esparza et al. | |
| 7,027,564 | B2 | 4/2006 | James | |
| 7,042,985 | B1 | 5/2006 | Wright | |
| 7,218,721 | B1 | 5/2007 | Vincent et al. | |
| 7,386,111 | B2 | 6/2008 | Holder | |
| 7,394,803 | B1 | 7/2008 | Petit-Huguenin et al. | |
| 7,680,262 | B2 | 3/2010 | Holder | |
| 7,684,554 | B1 | 3/2010 | Vincent et al. | |
| 2001/0005412 | A1 | 6/2001 | Light et al. | |
| 2001/0005415 | A1 | 6/2001 | Grunsted et al. | |
| 2001/0014919 | A1 | 8/2001 | Tzirin | |
| 2001/0036258 | A1* | 11/2001 | Sugla | H04M 3/436 379/211.01 |
| 2002/0007391 | A1 | 1/2002 | Suzuki | |
| 2002/0039372 | A1* | 4/2002 | Christie | H04J 3/125 370/522 |
| 2002/0049815 | A1 | 4/2002 | Dattatri | |
| 2002/0049860 | A1 | 4/2002 | Koitinen | |
| 2002/0055879 | A1 | 5/2002 | Wengrovitz et al. | |
| 2002/0061100 | A1 | 5/2002 | DiCamillo et al. | |
| 2002/0095516 | A1 | 7/2002 | Nada | |
| 2002/0112073 | A1 | 8/2002 | McLampy et al. | |
| 2002/0114430 | A1 | 8/2002 | Murata | |
| 2002/0126818 | A1 | 9/2002 | Cai et al. | |
| 2002/0129131 | A1 | 9/2002 | Yamashita | |
| 2002/0150083 | A1 | 10/2002 | Fangman et al. | |
| 2002/0191635 | A1 | 12/2002 | Chow et al. | |
| 2003/0005280 | A1 | 1/2003 | Bobde et al. | |
| 2003/0041132 | A1 | 2/2003 | Lim et al. | |
| 2003/0043787 | A1 | 3/2003 | Emerson, III | |
| 2003/0053446 | A1 | 3/2003 | Kwon | |
| 2003/0095542 | A1 | 5/2003 | Chang et al. | |
| 2003/0108064 | A1 | 6/2003 | Bilke et al. | |
| 2003/0163526 | A1 | 8/2003 | Clarisse et al. | |
| 2003/0174695 | A1 | 9/2003 | Lautenschlager et al. | |
| 2004/0019638 | A1* | 1/2004 | Makagon | G06Q 10/06 709/204 |
| 2004/0028025 | A1 | 2/2004 | Chang | |
| 2004/0028207 | A1 | 2/2004 | Kato | |
| 2004/0039938 | A1 | 2/2004 | Katz et al. | |
| 2004/0057415 | A1 | 3/2004 | Colson et al. | |
| 2004/0101124 | A1* | 5/2004 | Koch | H04M 3/2218 379/220.01 |
| 2004/0110465 | A1* | 6/2004 | Bedingfield | H04Q 3/0045 455/3.05 |
| 2004/0114575 | A1 | 6/2004 | Morita et al. | |
| 2004/0190711 | A1 | 9/2004 | Miyajima | |
| 2004/0205209 | A1 | 10/2004 | Wengrovitz et al. | |
| 2004/0205777 | A1 | 10/2004 | Zalenski et al. | |
| 2004/0215770 | A1 | 10/2004 | Maher, III et al. | |
| 2004/0223606 | A1 | 11/2004 | Enete et al. | |
| 2004/0258021 | A1 | 12/2004 | Kashimoto et al. | |
| 2004/0258238 | A1 | 12/2004 | Wong | |
| 2004/0258239 | A1 | 12/2004 | Gallant et al. | |
| 2005/0018659 | A1 | 1/2005 | Gallant et al. | |

FOREIGN PATENT DOCUMENTS

| | | |
|---|---|---|
| WO | 02/03718 | 1/2002 |
| WO | 2003043225 A1 | 5/2003 |

OTHER PUBLICATIONS

Simu, A., et al. "STUN—aware NAT draft-simu-midcom-stun-aware-nat-00.txt" IETF Standard-Working-Draft Internet Engineering Task Force (IETF), CH, Apr. 10, 2002, XP015005296, ISSN: 0000-0004.

Rosenberg et al., "NAT Friendly SIP," Internet Engineering Task Force (Jul. 20, 2001), available at http://tools.ietf.org/html/draft-rosenberg-sip-entfw-02 (last accessed May 15, 2008).

Rosenberg, J., et al. "STUN—Simple Traversal of UDP Through Network Address Translators" IETF Standard-Working-Draft, Internet Engineering Task Force (IETF), CH, vol. midcom, No. 3,Oct. 14, 2002, XP015002624, ISSN: 0000-0004.

Mahy, R., et al. "STUN—aware NAT draft-simu-midcom-stun-aware-nat-00.txt" IETF Standard-Working-Draft Internet Engineering Task Force (IETF), CH, Apr. 10, 2002, XP015005296, ISSN: 0000-0004.

Mahy, R., et al. Pre-Midcom Requirements for Traversal of NATs for traffic not supported by STUN draft-mahy-midcom-premidcom-relay-reqs-00.txt IETF Standard-Working-Draft, Internet Engineering Taskforce, IETF, CH, Feb. 2003, XP0 1 500427 1, ISSN: 0000-0004.

Fineberg, V. "A Practical Architecture for Implementing End-to-End QoS in an IP Network" Communications Magazine, IEEE vol. 40, Issue 1, Jan. 2002 pp. 122-130.

Melvin, H. et al. "Time Synchronization for VoIP Quality of Service", Internet Computing, IEEE vol. 6, Issue 3, May-Jun. 2002 pp. 57-63.

Srisuresh, et al., "Middlebox Communication Architecture and Framework," RFC 3303, Internet Engineering Task Force (Aug. 2002), available at htt://www.ietf.org/rfc/rfc3303.txt (last accessed May 15, 2008).

Abbott, Nadine, "Alternatives for Providing Routing and Location Information to Support Emergency Calling from IP Enterprises," NENA Technical Information Document, Telecordia Technologies (Oct. 3, 2003), pp. 1-16, XP002323684.

* cited by examiner

METHOD AND APPARATUS FOR PLACING A LONG DISTANCE CALL BASED ON A VIRTUAL PHONE NUMBER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

The present application is a continuation of U.S. patent application Ser. No. 12/692,808, filed Jan. 25, 2010 now abandoned which in turn is a continuation of U.S. patent application Ser. No. 12/153,504, filed May 20, 2008, now U.S. Pat. No. 7,680,262, which is a divisional of U.S. patent application Ser. No. 10/774,689, filed Feb. 10, 2004, now U.S. Pat. No. 7,386,111, the contents of all of which are incorporated herein by reference.

FIELD OF THE INVENTION

The present invention relates to long distance phone calls. More specifically, the present invention relates to a method and apparatus for minimizing the cost of making a long distance phone call.

BACKGROUND OF THE INVENTION

Traditional phone systems include local carriers and long distance carriers. Local carriers connect calls within a given local area, while long distance carriers carry calls between the local carriers. The telephone lines from a home or office connect directly to a wire center, which is often referred to as a central office. The central office has one or more switches, which route or direct telephone calls from one destination to another.

Telephone numbers typically include an area code, and a seven digit telephone number. The seven digit telephone number includes a three digit central office number, and four digit central office extension. The three digit central office number directs calls to a particular central office. Once the call reaches the desired central office, the four digit extension directs the call to a line that is served by that central office. Area codes are typically used for long distance phone calls, as discussed below.

Local telephone calls within a small area are often completed within a single central office. In this configuration, calls within the same area are served by the same central office. The central office connects the incoming call to the destination number. If the area is larger however, communication with a second central office may be necessary. The two central offices are typically connected by a trunk, which is a line between the central offices. The destination receives the call from the first central office and then directs it to the appropriate destination, based on the dialed phone number.

Each area code, as mentioned above, corresponds to a particular group of central offices. When a user dials an area code and then the seven digit telephone number, the central office analyzes the dialed number. If the dialed number is located within the Local Transport and Access Area (LATA), then the call is directed to the appropriate central office. A LATA, or local calling area, is typically a contiguous geographic area. If the dialed number is outside of the LATA, the local central office checks its database to determine which long distance company the user has selected for making the call. The local central office then switches the call to lines that are connected to the long distance company's nearest switch, often referred to as a point of presence (POP). Once the long distance company receives the call, it analyzes the phone number and routes the call across the long distance network to the POP that is closest to the called number. That POP routes the call back to a local central office that is near the destination phone, which then completes the call as described above.

The local and long distance companies incur costs for the equipment, switching calls, and maintaining their equipment. All of these costs are eventually passed on to the consumer. Because local calls involve one or two switching stations owned by one company, the costs of a local telephone call are typically low. Typically, a consumer pays a fixed fee for a unlimited amount of local calls. However, because long distance calls are transferred from the local telephone company, to a long distance carrier, and then back to a local telephone company, the cost of a long distance call is greater than a local call. Typically, long distance calls are charged by the minute. However, rates vary depending on a number of factors, such as the number of switches between the originating and destination numbers and taxes. For example, long distance calls between countries may be higher than long distance calls within a given country.

A continuing need exists for a method and apparatus that is capable of reducing the costs associated with long distance telephone calls.

SUMMARY OF THE INVENTION

In one embodiment, the present invention comprises a method for transmitting information between two or more points. The information that is transmitted can be, for example, a telephone call. The method comprises receiving a virtual number from at least one point on an originating network at a first intermediate point on a computer network. Then, based on the virtual number, a second intermediate point on the computer network is determined. The first and second intermediate points are preferably capable of communicating over the computer network.

Once the second intermediate point is determined, a connection is established between the second intermediate point and a point on the destination network, based on the virtual number that was entered at the originating network. The first and second intermediate points then allow the point on the originating network and the point on the destination network to communicate. That communication can, but does not need to, include converting information from the originating and destination networks into a form suitable for transmission over the computer network.

In this embodiment, the virtual number can include, for example, an area code that is within the local calling area of the point on the originating network. The point on the originating network may, but does not have to be, a telephone. The virtual number is assigned to the first and second intermediate points, which may be servers, to allow communication between the originating point and the destination point based on a call routing table.

In one exemplary embodiment of the present invention, data is preferably transmitted over the computer network based on data packets, and data is preferably transmitted over the originating and destination networks by transmitting analog signals. In order to allow the originating user and the destination user to communicate, the first and second intermediate points are preferably capable of converting analog signals into digital data that can be put into data packets, and vice versa.

In another exemplary embodiment, the present invention comprises an apparatus for transmitting information between at least two points. The apparatus includes at least one point on an originating network that is capable of communicating with a first intermediate point based on at least one virtual number. Also included is at least one point on a destination network capable of communicating with a second intermediate point based on the virtual number.

In one embodiment, the point on the originating network and the point on the destination network are preferably telephones and the first and second intermediate points may be servers. A computer network is operatively connected to the first and second server to allow the telephones to communicate. The servers are preferably capable of converting information from the telephones into a form suitable for transmission over the computer network.

In this embodiment, the virtual number can include, for example, an area code that is within the local calling area of the originating telephone. The virtual number is assigned to the first and second servers to allow communication between the originating and destination telephones. The first and second servers allow this communication based on call routing tables, which are preferably part of the servers.

In one exemplary embodiment of the present invention, data from the telephones is transmitted as analog signals, and data is transmitted over the computer network based on data packets. The servers can, but do not need to, be capable of analog to digital conversion, or digital to analog conversion. This allows data from the telephones to be transmitted over the computer network as digital data in the form of, for example, data packets.

BRIEF DESCRIPTION OF THE DRAWINGS

Further features and advantages of the invention can be ascertained from the following detailed description that is provided in connection with the drawings described below.

DETAILED DESCRIPTION OF THE PREFERRED EMBODIMENTS

Figure 1:
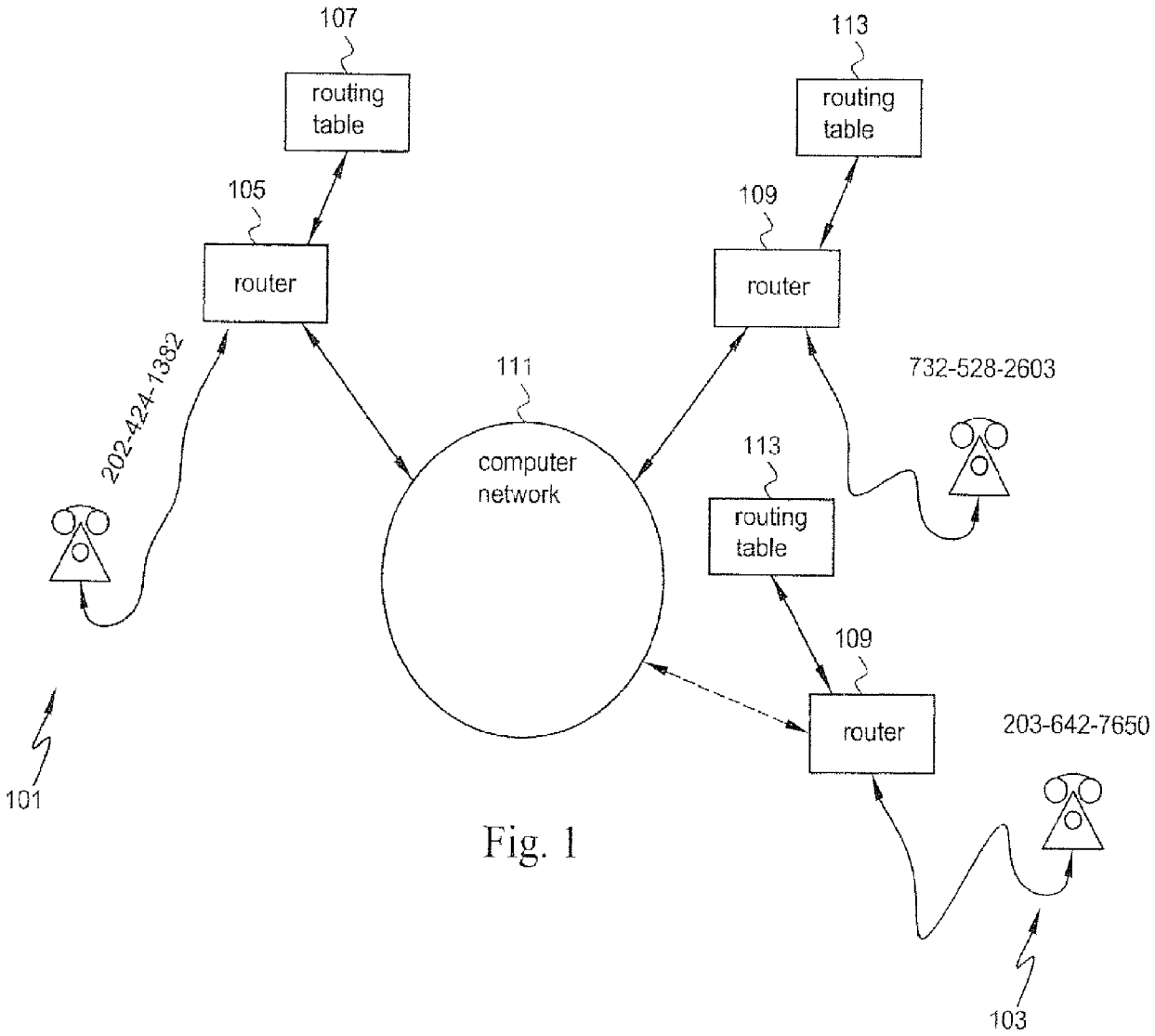
FIG. 1 is a block diagram showing an overview of an exemplary system according to an embodiment of the present invention.

Increasingly, phone companies are using computer networks such as the Internet, to transport long distance calls from one destination to another. Transferring voice calls over a data network is typically accomplished by converting analog voice signals into data packets. This is typically, but not necessarily, accomplished using an industry standard known as Voice over Internet Protocol (VoIP). Transporting calls over computer networks allows local phone companies to bypass long distance carriers. Additionally, because computer network infrastructures are already in place, the cost of transporting calls over computer networks is greatly minimized.

The present invention provides a method and apparatus for minimizing the cost of a long distance call by transporting voice traffic over computer networks. In one embodiment, the present invention comprises a method and apparatus for transmitting voice information between originating and destination points. The originating and destination points may include, but are not limited to, telephones, fax machines, pagers, computers, two way radios, cellular telephones, or telephones operatively connected to the public switched telephone network (PSTN). In a preferred embodiment, the originating and destination points are telephones operatively connected to the PSTN.

The two telephones can be, but do not have to be, operatively connected to separate networks, and each network is operatively connected to its own intermediate point. The intermediate points, which are preferably operatively connected by a computer network, allow the two telephone users to communicate based on the virtual number that is entered by the user of the originating telephone.

The area code of the virtual number is preferably within the local calling area of the originating telephone. In an exemplary embodiment, each virtual number is assigned to a destination telephone. The assignment information is stored in a memory, and can be referenced to determine which destination telephone number a virtual number is assigned to. The memory may, but does not have to be, operatively connected to the two intermediate points. Operatively connecting a memory to each of the two intermediate points allows the delay between receiving a number and determining its destination to be minimized.

In an exemplary embodiment, when a virtual number is received by a first intermediate point, the call may be routed from the first intermediate point to a second intermediate point that is within the local calling area of the destination telephone. The second intermediate point then directs the call to the destination telephone. The two intermediate points can direct a call to any destination number, regardless of the distance between the two telephones. This allows a user to access a long distance telephone using only a local virtual phone number, and provides the advantage of reducing the cost of the call.

Information may be transmitted on the originating and destination networks in any manner known to those skilled in the art. This may include, but is not limited to, information in analog or digital format. Additionally, any type of information may be transmitted between the two points on the originating and destination networks. This may include, but is not limited to, voice, data, or facsimile transmissions.

In one embodiment, the present invention comprises a set of routers distributed at different geographical areas. Each router is operatively connected to a computer network such that they are capable of communicating with each other. Each of the routers are preferably operatively connected to one or more originating or destination networks to receive and process telephone calls.

The router is preferably capable of providing an interface between a central office and the computer network. This may include, but is not limited to, converting data into a format capable of transmission over the computer network. In one embodiment, the router may comprise any computing device known to those skilled in the art. For example, in some embodiments the router may comprise a processor, such as a computer. Alternately, the router may comprise a router that is modified to interpret phone numbers and convert voice signals into data packets. In other embodiments, the router may comprise a server, or proxy server.

In one embodiment, the router receives and [interpret] *interprets* a virtual phone number transmitted from an originating network. After processing a phone number to determine its destination, the router connects to another router that is connected to the destination network. Once a connection is established between the originating and destination routers, the originating router converts the voice data into data packets using a desired protocol, for example, VoIP or VoP. Preferably, the process of converting the voice data into data packets is performed on a real-time, continuous basis. Each router can also be capable of converting the data packets back into voice data on a real-time, continuous basis. Such conversion, however, need not be performed by the router.

Data conversion on a real-time, continuous basis allows data to be transmitted between the originating and destination networks and the computer network with a substantially minimal amount of delay. This provides the advantage of allowing the originating and destination user to communicate with substantially minimal audible distortion. This also allows the two users to communicate over long distances while minimizing the cost of the call.

In one embodiment, a virtual phone number is assigned to a phone number on the destination network ("physical number"). The virtual phone number is assigned to a local router, such as a proxy server. This may be done by updating the memory that stores the virtual numbers and the physical number that they are assigned to. Each virtual phone number serves as a alias for, and directs calls to, a destination physical number. The virtual phone number does not exist on any physical device on the originating or destination network. Thus, calls do not have to be routed through any physical device on the originating or destination networks, which reduces the complexity and costs of routing a call.

FIG. 1 is a block diagram showing an overview of an exemplary system according to an embodiment of the present invention. As shown in FIG. 1, user 101 places a call to user 103. In order to do so, user 101 dials the virtual number that is assigned to the physical number of user 103. As shown in FIG. 1, user 101 dials the number, "202-424-1382." This is a local call for user 101, and allows the user 101 to access router 105. In order to direct the phone call to the appropriate destination, router 105 communicates with a routing table 107. Preferably, routing table 107 is included in router 105. However, in some embodiments it may be a separate element, or part of another element can communicate with router 105.

The router 105 communicates with the routing table 107 to determine which call router 109 the virtual phone number "202-424-1382" corresponds to. In this exemplary embodiment, the routing table includes the physical number that is assigned to the virtual number and information that instructs router 105 to connect to a second router 109. The routing table determines which router 109 to connect to based on the proximity of router 109 to user 103. The router 109 that is chosen is preferably within the local calling area of user 103, and may be positioned closest to user 103.

Once this is determined, router 105 transfers the call to router 109 via a computer network 111. When the call is transferred from router 105 to router 109, the virtual numbers, or its equivalents, are included in the transmitted information. When the call reaches router 109, the router 109 communicates with the routing table 113 to determine what destination number the virtual number is assigned to. Based on this communication, router 109 determines that the destination phone number is "732-528-2603," which corresponds with user 103. A connection is then established between router 109 and user 103. The connection may include, but is not limited to, a connection via, for example, the Internet protocol. Once the connection is established, user 101 and user 103 can communicate without incurring typical long distance charges.

Figure 2:
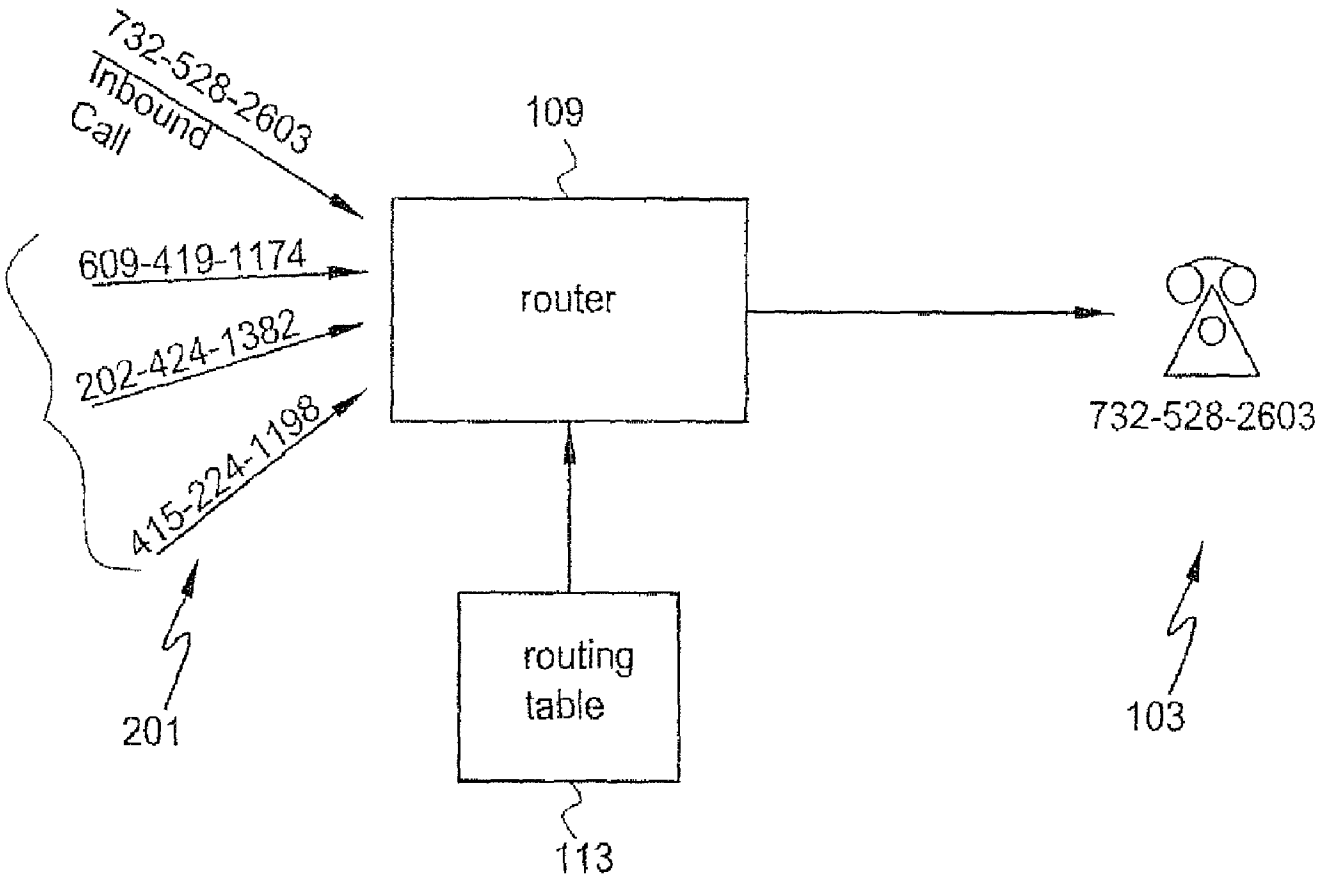
FIG. 2 is a diagram showing an exemplary embodiment of the present invention.

FIG. 2 is a diagram showing an exemplary embodiment of the present invention. As shown in FIGS. 1 and 2, multiple virtual numbers 201 may be assigned to a physical number. In this embodiment, each router 105 in a different geographical area may have a different virtual number. Alternately, each router 105 may be accessed using a plurality of virtual numbers. Each virtual number preferably allows an originating user 101 to dial a number within their local area code in order to access a single destination user 103. This provides the advantage of allowing users in different geographical locations to communicate with user 103 while only dialing a local number. In this embodiment, the multiple users 101 may communicate with user 103 simultaneously or independently.

Figure 3:
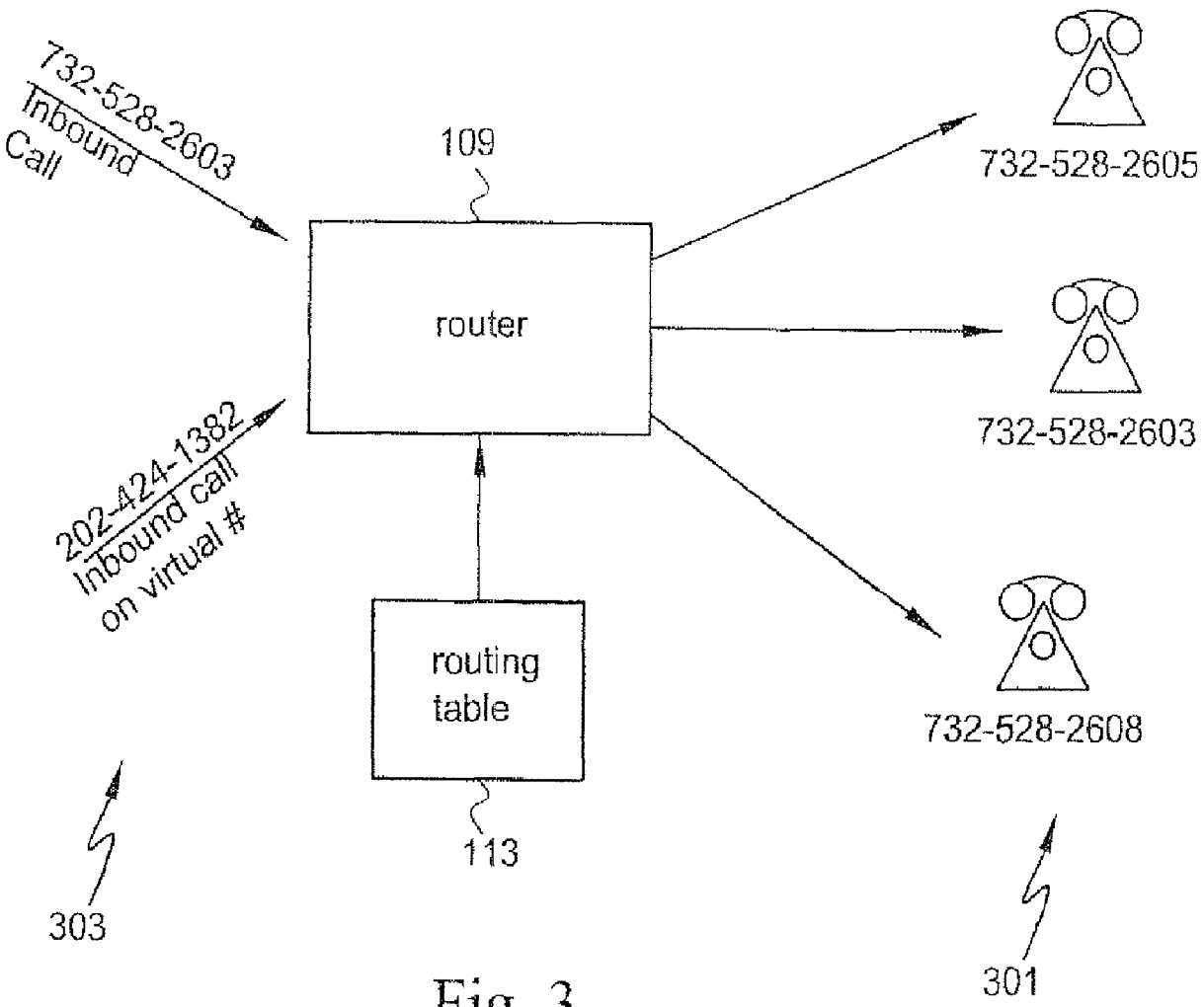
FIG. 3 is a diagram showing another exemplary embodiment of the present invention.

FIG. 3 is a diagram showing another exemplary embodiment of the present invention. In this embodiment, one or more virtual numbers may be assigned to multiple physical numbers 301. In other words, a virtual number may be used to call more than one physical number 301. The calls may be directed to their assigned physical number 301 in any desired manner, as described below.

In one embodiment the virtual number may be assigned such that the [server] *router* 109 rings the physical devices 301 all at once, or one at a time. Information regarding the order of routing may be stored in the routing table 113. If all of the devices ring at the same time, then the call is routed to the physical number 301 that answers first. If each phone 301 rings one at a time, the user has the option of rolling over to the next physical number in a random order or sequentially by a predefined order.

A virtual number that is assigned to a physical device may be changed upon a users request. This can be done quickly and with minimal cost by reprogramming the routing table, such as routing table 107 shown in FIG. 1. Preferably, this change can be done with minimal manual intervention. However, in some embodiments a router may be reprogrammed manually.

Although the present invention has been described with reference to particular embodiments, it will be understood to those skilled in the art that the invention is capable of a variety of alternative embodiments within the spirit of the appended claims.

What is claimed is:

1. A method of establishing a communications link, comprising:

receiving a virtual telephone number at a first intermediate point from an originating point, the first intermediate point being operatively connected to a data network; and transmitting a call setup request over the data network that includes a second intermediate point, wherein the call setup request includes the virtual telephone number [or its equivalent], and wherein information in the call setup request allows the second intermediate point to establish a communications link to a destination point that corresponds to the virtual telephone number.

2. The method of claim 1, further comprising determining an identity of the second intermediate point based on the virtual telephone number [or its equivalent].

3. The method of claim 2, wherein the step of determining the identity of the second intermediate point comprises:

sending a query to an intermediate point routing table, the query including the virtual telephone number [or its equivalent]; and receiving, from the intermediate point routing table, an indication of the identity of the second intermediate point.

4. The method of claim 3, wherein the step of receiving an indication of the identity of the second intermediate point comprises receiving an Internet protocol (IP) address of a proxy server that can act as the second intermediate point.

5. The method of claim 3, further comprising:

determining, based on the virtual telephone number [or its equivalent], the identity of the second intermediate point, the second intermediate point being capable of establishing a communications link to a destination point that corresponds to the virtual telephone number; and transmitting the identity of the second intermediate point to the first intermediate point.

6. The method of claim 1, further comprising establishing a communications link between the second intermediate point and the destination point using information in the call setup request.

7. The method of claim 6, wherein the step of establishing a communications link between the second intermediate point and the destination point comprises:

sending a query to a destination point routing table, the query including the virtual telephone number [or its equivalent];

receiving, from the destination point routing table, an indication of [the] *an* identity of [the] *a* destination point that corresponds to the virtual telephone number; and establishing a communications link between the second intermediate point and the destination point using the identity information received from the destination point routing table.

8. The method of claim 7, wherein the indication of the identity of the destination point comprises a physical telephone number.

9. A system for establishing a communications link, comprising:

*a computer server that is operatively connected to a data network and that acts as a first intermediate point in the data network, where the computer server is configured to:*

[means for receiving] *receive* a virtual telephone number [at a first intermediate point] from an originating point[, the first intermediate point being operatively connected to a data network]; and

[means for transmitting] *transmit* a call setup request over the data network [from the first intermediate point] to a second intermediate point, wherein the call setup request includes the virtual telephone number [or its equivalent], and wherein information in the call setup request allows the second intermediate point to establish a communications link to a destination point that corresponds to the virtual telephone number.

10. A system for establishing a communications link, comprising:

an intermediate point routing table that includes information linking virtual telephone numbers to identities of intermediate points capable of establishing communications links to destination points associated with the virtual telephone numbers; and a first intermediate point *comprising at least one processor* that receives a virtual telephone number from an originating point, and that transmits a call setup request to a second intermediate point, wherein the call setup request includes the virtual telephone number [or its equivalent], and wherein the intermediate point routing table, the first intermediate point and the second intermediate point are all coupled to a data network.

11. The system of claim 10, wherein information in the call setup request allows the second intermediate point to establish a communications link to a destination point that corresponds to the virtual telephone number.

12. The system of claim 10, wherein the first intermediate point queries the intermediate point routing table to determine an identity of the second intermediate point.

13. The system of claim 10, wherein the first intermediate point sends a query to the intermediate point routing table, the query including the virtual telephone number [or its equivalent], wherein the intermediate point routing table uses the virtual telephone number [or its equivalent] to determine an identity of the second intermediate point, and wherein the intermediate point routing table sends an indication of the identity of the second intermediate point to the first intermediate point in response to the query.

14. The system of claim 13, wherein the indication of the identity of the second intermediate point comprises an Internet protocol (IP) address of a proxy server that can act as the second intermediate point.

15. The system of claim 10, wherein the second intermediate point uses the virtual telephone number to establish a communications link to a destination point corresponding to the virtual telephone number.

16. The system of claim 15, wherein the first intermediate point establishes a communications link to the originating point, and wherein a communications link is also established between the first intermediate point and the second intermediate point such that communications can pass between the originating point and the destination point via the first and second intermediate points.

17. The system of claim 16, wherein the second intermediate point sends a query to a destination point routing table, the query including the virtual telephone number [or its equivalent], wherein the destination point routing table uses the virtual telephone number [or its equivalent] to determine an identity of a destination point corresponding to the virtual telephone number, and wherein the destination point routing table sends an indication of the identity of the destination point to the second intermediate point in response to the query.

18. The system of claim 17, wherein the second intermediate point uses the *indication of the* identity [information it] *of the destination point that the second intermediate point* receives from the destination point routing table to establish a communications link to the destination point.

19. The system of claim 17, wherein the destination point routing table sends a physical telephone number corresponding to the virtual telephone number to the second intermediate point.

20. The system of claim 19, wherein the second intermediate point uses the physical telephone number to establish a communications link to the destination point.

*21. A system for facilitating at least a portion of a telephony communication between an originating point and a destination point, comprising:*

*a first intermediate point comprising at least one processor that is configured to receive a communication setup request from a second intermediate point, wherein the communication setup request includes a virtual telephone number received from the originating point, wherein the virtual telephone number corresponds to a physical number associated with the destination point; and*

*a first routing table that comprises a part of the first intermediate point, wherein the first intermediate point is configured to use the communication setup request*

*and information in the first routing table to determine an identity of the destination point;*

*wherein the first intermediate point facilitates the telephony communication, at least in part, by receiving the communication setup request over a data network from the second intermediate point.*

*22. A system for facilitating at least a portion of a communication link between an originating point and a destination point, comprising:*

*a first intermediate point configured to receive a virtual number from the originating point, wherein the virtual number corresponds to the destination point, and wherein the first intermediate point is configured to send a communication setup request to a second intermediate point over a data network, the communication setup request including the virtual number; and*

*a routing table that comprises information linking virtual numbers with the identities of intermediate points capable of establishing communications links to destination points based on a proximity of the intermediate points to the destination points.*

*23. A system for facilitating at least a portion of a communication link between an originating point and a destination point, comprising:*

*a first intermediate point configured to receive a virtual number from an originating point, and*

*a routing database that comprises information that associates second intermediate points with destination points that correspond to virtual numbers based on a proximity of the second intermediate points to the destination points;*

*wherein the first intermediate point is configured to use the virtual number and information in the routing database to determine the identity of a second intermediate point associated with the destination point that corresponds to the virtual number, and wherein the first intermediate point is configured to send a communication setup request to the second intermediate point over a data network, the communication setup request including the virtual number.*

*24. A method of facilitating at least a portion of a communication link between an originating point and a destination point, comprising:*

*receiving, from the originating point, a virtual number at a first intermediate point, wherein the virtual number corresponds to the destination point;*

*determining an identity of a second intermediate point capable of communicating with the destination point based on a proximity of the second intermediate point to the destination point; and*

*sending a communication setup request to the second intermediate point over a data network, the communication setup request including the virtual number.*

* * * * *